United States Patent
John et al.

(10) Patent No.: US 10,949,741 B2
(45) Date of Patent: Mar. 16, 2021

(54) GENERATING SETS OF TRAINING PROGRAMS FOR MACHINE LEARNING MODELS

(71) Applicant: Board of Regents, The University of Texas System, Austin, TX (US)

(72) Inventors: Lizy Kurian John, Austin, TX (US); Reena Panda, Austin, TX (US); Xinnian Zheng, Austin, TX (US); Andreas Gerstlauer, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 888 days.

(21) Appl. No.: 15/631,682

(22) Filed: Jun. 23, 2017

(65) Prior Publication Data
US 2018/0025270 A1 Jan. 25, 2018

Related U.S. Application Data

(60) Provisional application No. 62/365,522, filed on Jul. 22, 2016.

(51) Int. Cl.
*G06N 3/08* (2006.01)
*G06N 3/04* (2006.01)
(Continued)

(52) U.S. Cl.
CPC .............. *G06N 3/08* (2013.01); *G06N 3/049* (2013.01); *G06N 3/0472* (2013.01); *G06N 20/00* (2019.01); *G06F 16/3346* (2019.01)

(58) Field of Classification Search
CPC ........ G06N 3/08; G06N 20/00; G06N 3/0472; G06N 3/049; G06F 16/3346
See application file for complete search history.

(56) References Cited

U.S. PATENT DOCUMENTS

| | | |
|---|---|---|
| 6,735,748 B1 | 5/2004 | Teig et al. |
| 9,020,244 B2 | 4/2015 | van Zwol et al. |

(Continued)

OTHER PUBLICATIONS

Xuechen Zhang, Yuhai Xu, and Song Jiang, "YouChoose: A Performance Interface Enabling Convenient and Efficient QoS Support for Consolidated Storage Systems", 2011, IEEE, pp. 1-12. (Year: 2011).*

(Continued)

*Primary Examiner* — Kamran Afshar
*Assistant Examiner* — Ying Yu Chen
(74) *Attorney, Agent, or Firm* — Robert A. Voigt, Jr.; Winstead PC (57) ABSTRACT

A method, system and computer program product for generating sets of training programs for machine learning models. Fixed values of one or more workload metrics are received from a user, where the workload metrics correspond to low-level program features which define particular low-level application behavior. A profile using the fixed values of the workload metrics is then created. A suite of synthetic applications is generated using the created profile to form a set of training programs which target particular aspects of program behavior. A machine learning model is then trained using the set of training programs. Since the generated synthetic applications provide a broader coverage of the program state-space, the formed set of training programs more accurately targets performance behavior thereby improving the prediction accuracy of the machine learning based predictive models.

20 Claims, 5 Drawing Sheets

(51) Int. Cl.
*G06N 20/00* (2019.01)
*G06F 16/33* (2019.01)

(56) References Cited

U.S. PATENT DOCUMENTS

| | | |
|---|---|---|
| 9,904,587 B1 * | 2/2018 | Potlapally ............ G06F 11/079 |
| 2015/0193697 A1 | 7/2015 | Vasseur et al. |
| 2015/0379425 A1 | 12/2015 | Dirac et al. |

OTHER PUBLICATIONS

Ahmed Ali-Eldin, Johan Tordsson, Erik Elmroth, and Maria Kihl, "Workload Classification for Efficient Auto-Scaling of Cloud Resources", May 21, 2013, https://webapps.cs.umu.se/uminf/reports/2013/013/part1.pdf, pp. 1-36. (Year: 2013).*

Reena Panda, Xinnian Zheng, Shuang Song, Jee Ho Ryoo, Michael LeBeane, Andreas Gerstlauer, and Lizy K John, "Genesys: Automatically Generating Representative Training Sets for Predictive Benchmarking", Jul. 17-21, 2016, 2016 SAMOS, IEEE, pp. 116-123. (Year: 2016).*

Panda et al., "Genesys: Automatically Generating Representative Training Sets for Predictive Benchmarking," Conference: 2016 International Conference on Embedded Computer Systems: Architectures, Modeling and Simulation (SAMOS), Jul. 17-21, 2016, pp. 1-8.

* cited by examiner

TABLE 1: CORE METRICS FORMING THE WORKLOAD PROFILE

| CATEGORY | METRICS | COUNT |
|---|---|---|
| INSTRUCTION-LEVEL CHARACTERISTICS | 1. INSTRUCTION MIX | 5 |
| | 2. INSTRUCTION COUNT | 1 |
| | 3. INSTRUCTION CACHE MISS RATE (ICMR) | 1 |
| | 4. INSTRUCTION LEVEL PARALLELISM (ILP) | 32 BINS |
| CONTROL-FLOW CHARACTERISTICS | 5. AVERAGE BASIC BLOCK SIZE | 1 |
| | 6. BRANCH TRANSITION RATE (BTR) | 1 |
| | 7. BRANCH MISPREDICTION RATE | 1 |
| MEMORY-ACCESS CHARACTERISTICS | 8. DATA FOOTPRINT | 1 |
| | 9. REGULAR/IRREGULAR BEHAVIOR | 1 |
| | 10. SPATIAL LOCALITY STRIDE BINS | 32 BINS |
| | 11. TEMPORAL LOCALITY BINS | 8 BINS |
| | 12. L1/L2 DATA CACHE MISS RATES | 2 |

FIG. 5

GENERATING SETS OF TRAINING PROGRAMS FOR MACHINE LEARNING MODELS

TECHNICAL FIELD

The present invention relates generally to machine learning models, and more particularly to generating sets of training programs providing a wide coverage of program behavior for effectively training machine learning models.

BACKGROUND

Fast and efficient design space exploration (referring to the systematic analysis and pruning of unwanted design points based on parameters of interest) is a critical requirement for designing and optimizing computer systems. But the growing complexity of hardware systems coupled with the rapid pace of development of new software technologies make efficient design space exploration challenging. Generally, detailed simulation-based techniques are employed for performing accurate performance/power analysis of programs. However, the high computational cost/run-time of detailed simulators and large workload sizes affects the efficiency of elaborate design space exploratory studies. Machine learning (ML) based predictive modeling has been proposed and widely explored in several research studies as a popular alternative that enables fast design space exploration. ML models have also been adopted in the industry finding applications in several areas, such as server-scheduling, cluster maintenance models, operating system scheduling, etc. For example, Google uses machine learning models for scheduling on their clusters.

Figure 1:
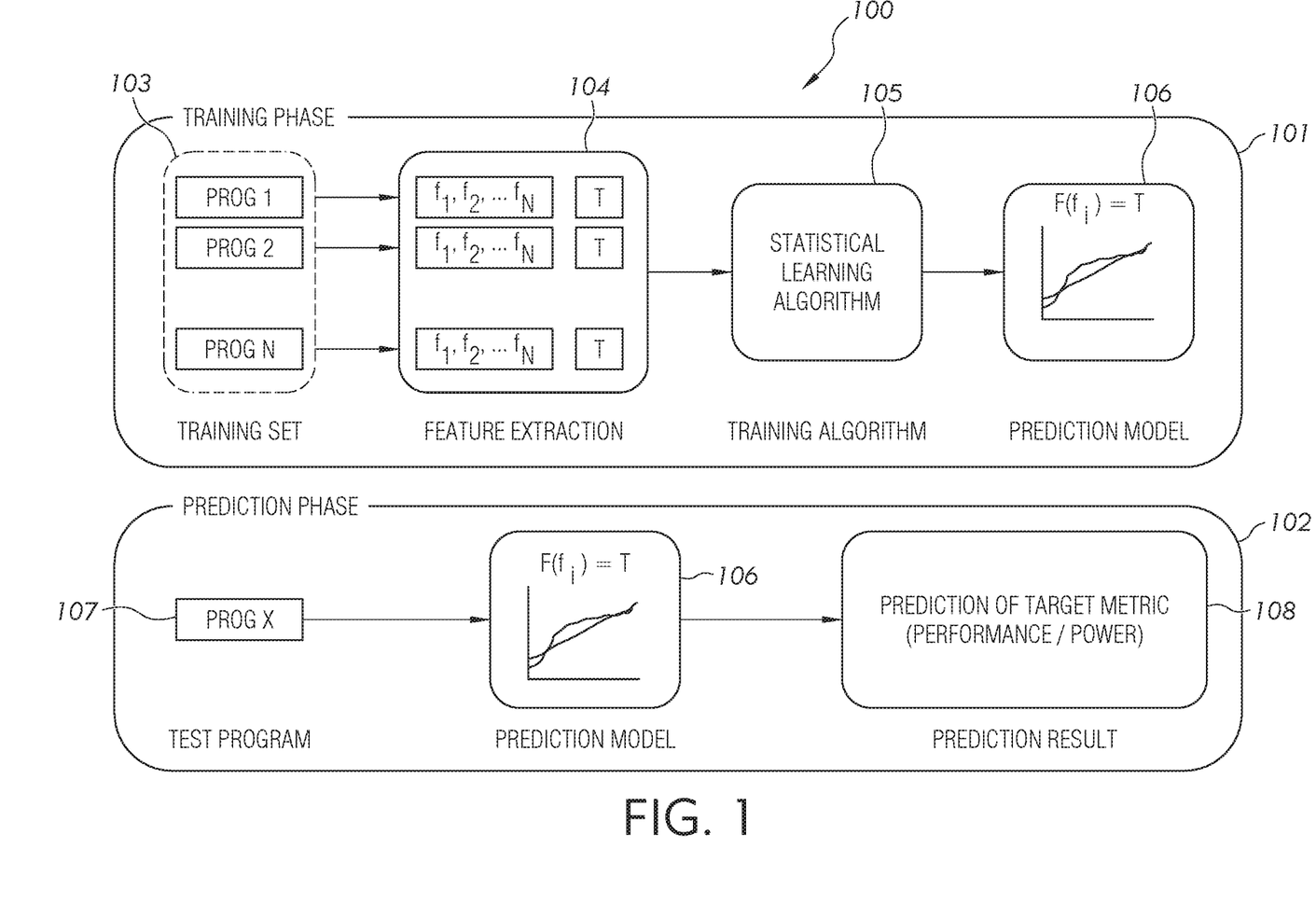
FIG. 1 illustrates the machine-learning based framework which consists of two phases: a training phase and a prediction phase.

A typical supervised learning-based ML framework employed for computer system modeling is shown in FIG. 1. FIG. 1 illustrates the machine-learning based framework 100 which consists of two phases: a training phase 101 and a prediction phase 102. Training phase 101 involves learning the inherent behavioral patterns of a set of training applications 103 by extracting features 104 used to train a learning algorithm 105. A predictive model 106 is then created based on the learned patterns from learning algorithm 105.

Prediction phase 102 involves the created ML model 106 using a test program 107 for predicting desired metrics 108 for new test applications (target applications). However, as model 106 learns patterns based on the behavior of training applications 103, its accuracy depends significantly on the ability of training set 103 to represent the wide-range of real-world applications that are run on any modern computer system. If the target applications have similar performance behavior as training applications 103, the accuracy of model 106 will be higher and vice-versa.

Most prior studies leveraging machine learning for computer design exploration select their training sets from standard benchmarking suites, such as SPEC-CPU®, SPECjbb®, MiBench, Implantbench, TPC-C®, TPC-H, etc. These suites consist of a "few" selected benchmarks representing certain classes of applications and are useful for benchmarking computer systems in general. But the number of applications included in such suites is often far from being sufficient for capturing the workload space and training any statistical model effectively. Furthermore, as standard benchmarking suites evolve at a much slower pace as compared to real-world software development, they are not always representative of the entire suite of applications that are run on modern-day computer systems. Furthermore, the significantly long run-times of many standard benchmarks limit several past studies to train their models running either short subsets of the benchmarks or using reduced input sets, which further reduces the representativeness of the training application sets. Alternatively, hand-written micro-benchmarks may be used for training predictive models, however, they are harder to write and increase the training time, which limits the number of micro-benchmarks that can be used to have a representative training set.

Hence, the training sets that are currently used for training machine learning models for computer system modeling have limited coverage of the program state-space thereby limiting the prediction accuracy of the machine learning models.

SUMMARY

In one embodiment of the present invention, a method for generating sets of training programs for machine learning models comprises receiving fixed values of a first set of one or more workload metrics from a user and/or generating random values of a second set of one or more workload metrics within a bounded range, where the workload metrics correspond to low-level program features which define particular low-level application behavior. The method further comprises creating, by a processor, a profile using the fixed values of the first set of one or more workload metrics and/or using the random values of the second set of one or more workload metrics. The method additionally comprises generating, by the processor, a suite of synthetic applications using the created profile to form a set of training programs which target particular aspects of program behavior.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

As discussed in the Background section, prediction accuracy of supervised learning based techniques used for computer system modeling depends heavily on the representativeness and quality of the programs used for training the predictive models. Most current technologies use either standard benchmarks (e.g., SPEC CPU®) or small microbenchmarks/kernels which are limited in number, not representative of the entire suite of applications that are run on modern-day computer systems and are tedious to write, such as in the case of micro-benchmarks.

The principles of the present invention are directed to a workload generation framework that allows systematic generation of synthetic applications providing a broader coverage of the program state-space and also creating directed programs having desired performance behavior. Training on more representative programs generated using the framework of the present invention improves the prediction accuracy of the machine learning based predictive models.

In particular, in one embodiment, the present invention is a synthetic workload generation framework that enables systematic generation of synthetic training programs covering a broad range of the application state-space. The generated synthetic applications can be used for training machine-learning based predictive models for computer performance and power prediction. The framework of the present invention systematically controls a set of core application characteristics in order to generate workloads with desired properties. It also provides the flexibility for the user to provide the values of some (or all) core metrics to generate targeted program behavior. The chosen core metric values together form unique profiles for the synthetic workloads, which are then fed into a code generator algorithm that leverages these desired metrics to generate a suite of synthetic applications.

Figure 2:
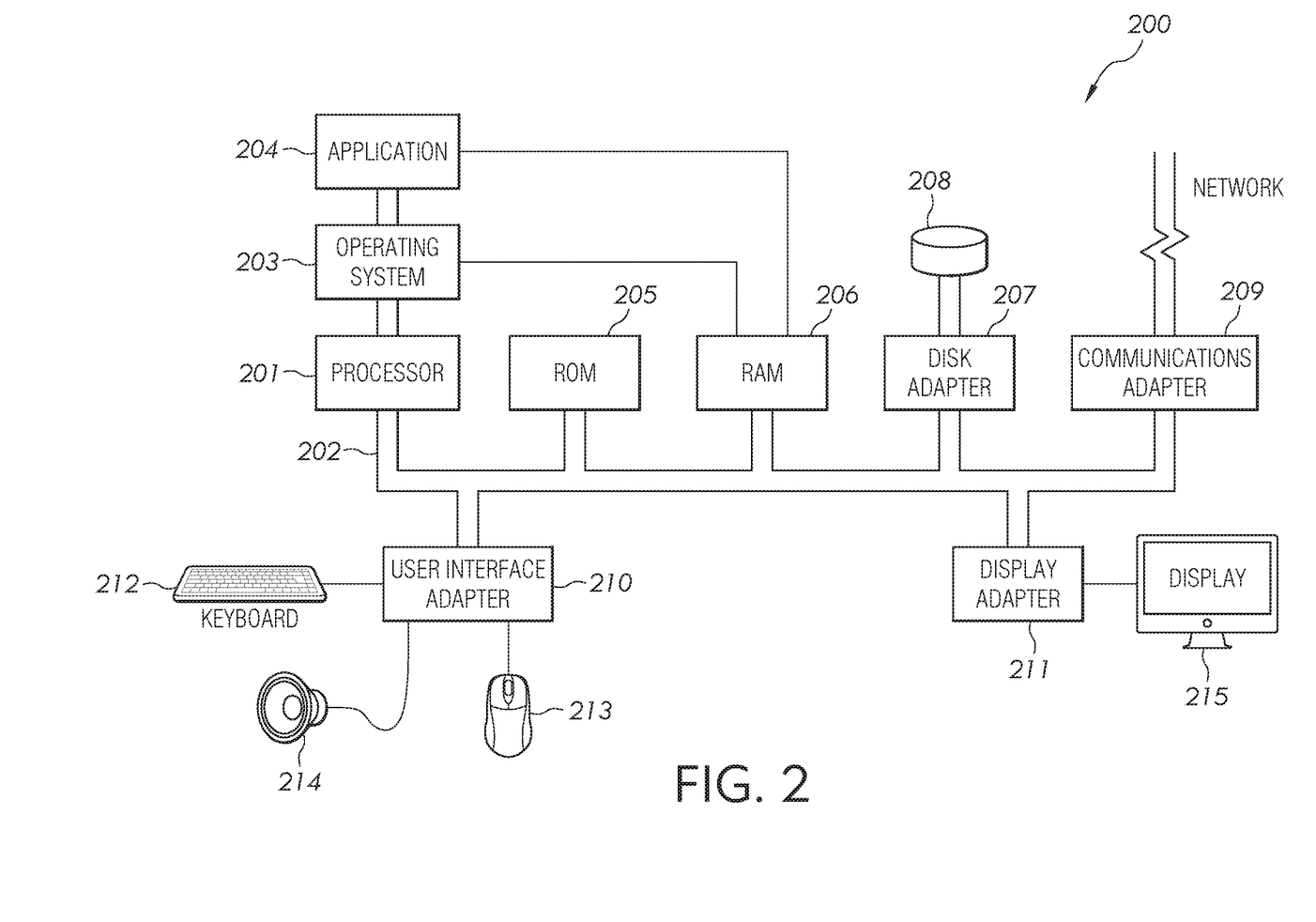
FIG. 2 illustrates a hardware configuration of a computing system which is representative of a hardware environment for practicing the present invention.

Referring now to the Figures in detail, FIG. 2 illustrates a hardware configuration of a computing system 200 which is representative of a hardware environment for practicing the present invention. Computing system 200 may be any type of computing device (e.g., portable computing unit, Personal Digital Assistant (PDA), smartphone, tablet computer, laptop computer, mobile phone, navigation device, game console, desktop computer system, workstation, Internet appliance and the like) configured with the capability of generating sets of training programs covering a broad range of the application state-space so as to improve the prediction accuracy of the machine learning based predictive models.

Referring to FIG. 2, computing system 200 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, an application for generating sets of training programs covering a broad range of the application state-space so as to improve the prediction accuracy of the machine learning based predictive models as discussed below in association with FIGS. 3-5.

Referring again to FIG. 2, read-only memory ("ROM") 205 may be coupled to system bus 202 and include a basic input/output system ("BIOS") that controls certain basic functions of computing system 200. Random access memory ("RAM") 206 and disk adapter 207 may also be coupled to system bus 202. It should be noted that software components including operating system 203 and application 204 may be loaded into RAM 206, which may be computing system's 200 main memory for execution. Disk adapter 207 may be an integrated drive electronics ("IDE") adapter that communicates with a disk unit 208, e.g., disk drive. It is noted that the program for generating sets of training programs covering a broad range of the application state-space so as to improve the prediction accuracy of the machine learning based predictive models, as discussed below in association with FIGS. 3-5, may reside in disk unit 208 or in application 204.

Computing system 200 may further include a communications adapter 209 coupled to bus 202. Communications adapter 209 may interconnect bus 202 with an outside network thereby allowing computing system 200 to communicate with other devices.

I/O devices may also be connected to computing system 200 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing system 200 through keyboard 212 or mouse 213 and receiving output from computing system 200 via display 215 or speaker 214. Other input mechanisms may be used to input data to computing system 200 that are not shown in FIG. 2, such as display 215 having touch-screen capability and keyboard 212 being a virtual keyboard. Computing system 200 of FIG. 2 is not to be limited in scope to the elements depicted in FIG. 2 and may include fewer or additional elements than depicted in FIG. 2. For example, while FIG. 2 illustrates computing system 200 with a single processor, computing system 200 may include multiple processors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, the principles of the present invention are directed to a workload generation framework that allows systematic generation of synthetic applications providing a broader coverage of the program state-space and also creating directed programs having desired performance behavior. Training on more representative programs generated using the framework of the present invention improves the prediction accuracy of the machine learning based predictive models.

In one embodiment, the present invention uses the supervised learning-based machine learning models, which typically consist of a training phase 101 and a prediction phase 102 as shown in FIG. 1. Referring to FIG. 1, during training phase 101, a set of programs 103, which constitute the training set, are executed to capture their performance features as well as the target reference metric(s) (e.g., performance or power). These features may be obtained from hardware performance events or parameters of the underlying machine configurations may also be used. A learning algorithm 105 constructs a predictive model 106 which associates applications' performance characteristics with the reference metric. During prediction phase 102, features of a test program 107 are used as an input to predictive model 106, which produces estimates of the target metrics 108.

The accuracy and usefulness of any such learning-based approach depends heavily on the training sets that are used for creating the predictive models. A well-formed training set can improve the accuracy and applicability of the predictive models to a wide range of test applications, while an ill-formed training set can affect the statistical model (e.g., cause overfitting) and lead to inaccuracies during the prediction phase. Ideally, a good training set should consist of programs that are representative of target application properties. As a wide-range of applications are run on modern computer systems, it is important that the training programs cover the application design-space sufficiently well. This increases the likelihood of finding programs with similar characteristics during the prediction phase.

Furthermore, a good training set should include a large number of program instances that provide broader and denser coverage of the overall application state space. A training set based on few program instances increases the risk of over-fitting the model with very similar programs.

However, it is challenging to find the right set of applications to create a balanced and broader-coverage training set.

Most prior studies either use standard benchmarks or special, hand-written micro-benchmarks to train the predictive models. While standard benchmarking suites usually consist of applications that represent particular application domains, they are not always representative of the wide-variety of applications that are run on modern day computer systems. As an example, there are significant differences in performance characteristics (instructions per cycle (IPC), control flow performance, cache miss statistics, instruction mix, etc.) between different benchmark suites. Furthermore, it is usually difficult to assess any application's low-level behavior by looking at the high-level application, unless the user is an expert in the respective domain. Additionally, special, hand-written micro-benchmarks are definitely useful in stressing particular program properties, but the process is very tedious and time-consuming which can significantly increase the training time. Finally, the number of program instances that can be created in this manner is usually far from being sufficient for training any statistical model.

The present invention overcomes the challenges in creating a balanced set of programs for training machine-learning models by implementing an automatic, workload generation methodology and framework that enables systematic generation of applications covering a broad range of the program behavior state-space. The present invention builds upon core low-level program characteristics and thus facilitates generation of training programs targeting specific program properties. The methodology of the present invention will now be discussed below.

Figure 3:
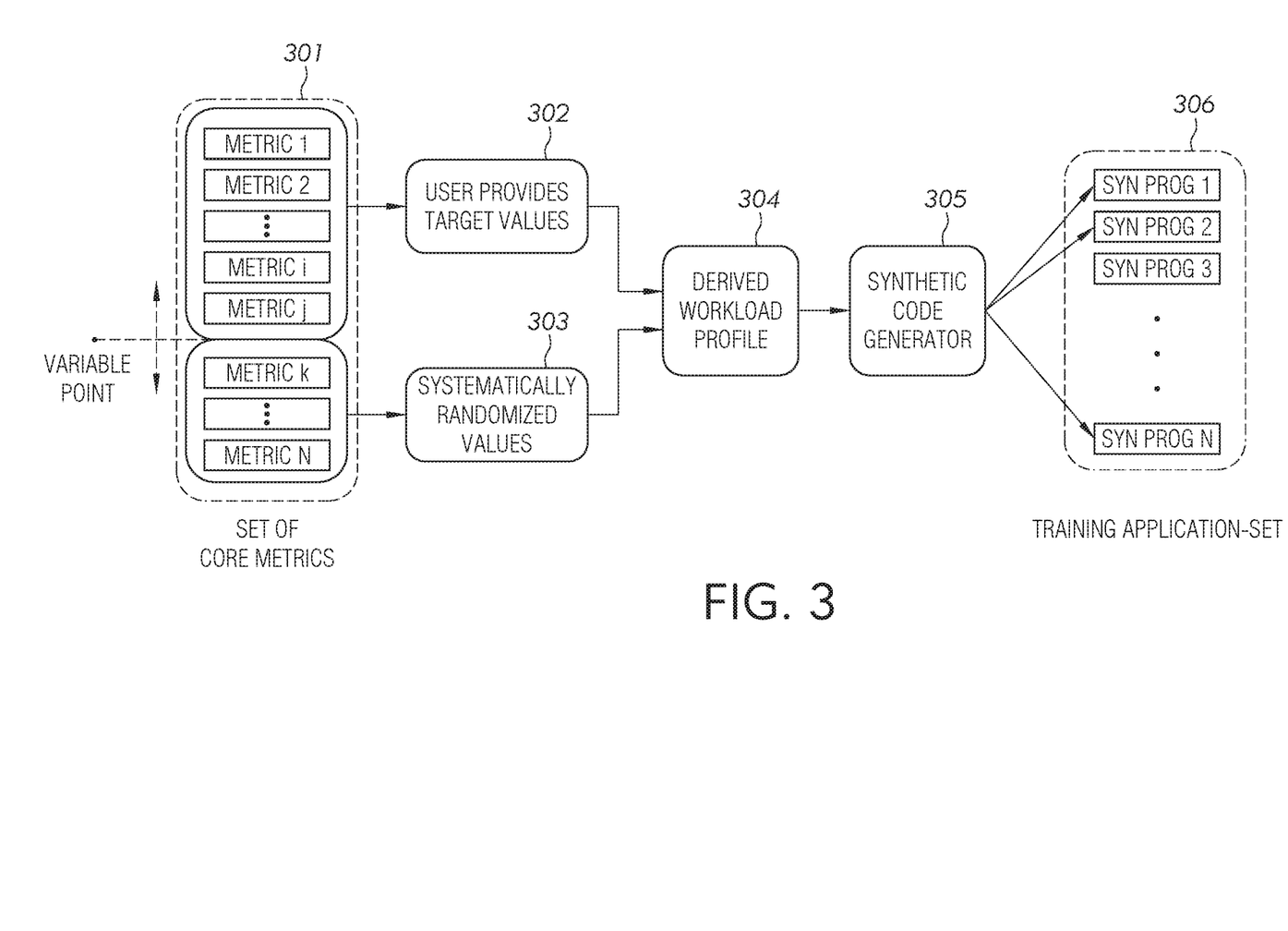
FIG. 3 illustrates the overall methodology and framework for generating sets of training programs for machine learning models in accordance with an embodiment of the present invention.

The present invention is a workload generation framework (shown in FIG. 3) that enables systematic generation of synthetic applications covering a broad range of the application state-space. FIG. 3 illustrates the overall methodology and framework for generating sets of training programs for machine learning models in accordance with an embodiment of the present invention.

Referring to FIG. 3, a set of workload metrics ("core metrics") 301, labeled as metric 1 . . . metric N, where N is a positive integer number, can be controlled systematically to generate workloads with desired properties. Each workload metric corresponds to low-level program features which define particular application characteristics and is available as a user-controllable knob. The user can provide the values of some (or all) core metrics in 302 to generate targeted program behavior. For the remaining set of core-metrics (if any) whose values are not fixed, the present invention randomizes their values in 303 within a reasonable bound in order to achieve well-rounded program coverage around the target behavior. By allowing each workload metric to be controlled using easy-to-use programmable knobs, the present invention allows the user to create targeted benchmarks with desired program features. Together, the values chosen for the individual core metrics act as unique profiles 304 for the synthetic workloads. These workload profiles 304 are fed into a code generator algorithm 305 that leverages these desired metrics to generate a suite of synthetic applications 306. Together, these applications 306 form a unique training-set of programs which target particular aspects of the program behavior depending upon the choice of the core metrics. These training programs can then be used to train any supervised machine learning model. In one embodiment, synthetic code generator 305 is a software module of the program for generating sets of training programs covering a broad range of the application state-space so as to improve the prediction accuracy of the machine learning based predictive model.

A method for generating these sets of training programs for machine learning models will now be discussed below in connection with FIGS. 3 and 4.

Figure 4:
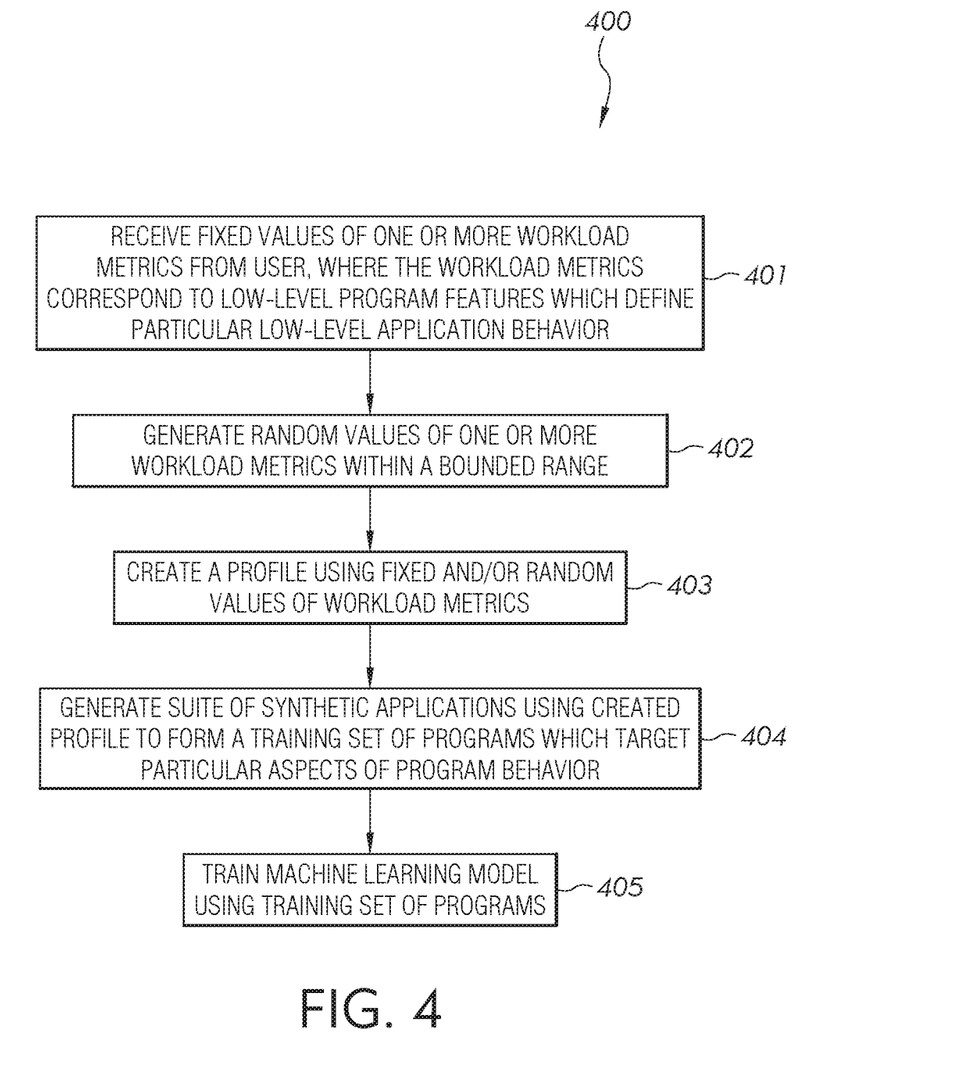
FIG. 4 is a flowchart of a method for generating sets of training programs for machine learning models in accordance with an embodiment of the present invention.

FIG. 4 is a flowchart of a method 400 for generating sets of training programs for machine learning models in accordance with an embodiment of the present invention.

Referring to FIG. 4, in conjunction with FIG. 3, in step 401, computing system 200 receives fixed values of one or more workload metrics from the user (as shown in 302 of FIG. 3), where the workload metrics correspond to low-level program features which define particular low-level application behavior.

Alternatively to step 401, or in conjunction with step 401, in step 402, computing system 200 generates random values of one or more workload metrics within a bounded range as shown in 303 of FIG. 3. In the embodiment where computing system 200 receives fixed values of one or more workload metrics from the user, computing system 200 generates random values of one or more other workload metrics within a bounded range as shown in 303 of FIG. 3.

Hence, computing system 200 receives fixed values of one or more workload metrics from the user (as shown in 302 of FIG. 3) and/or generates random values of one or more workload metrics within a bounded range as shown in 303 of FIG. 3.

Figure 5:
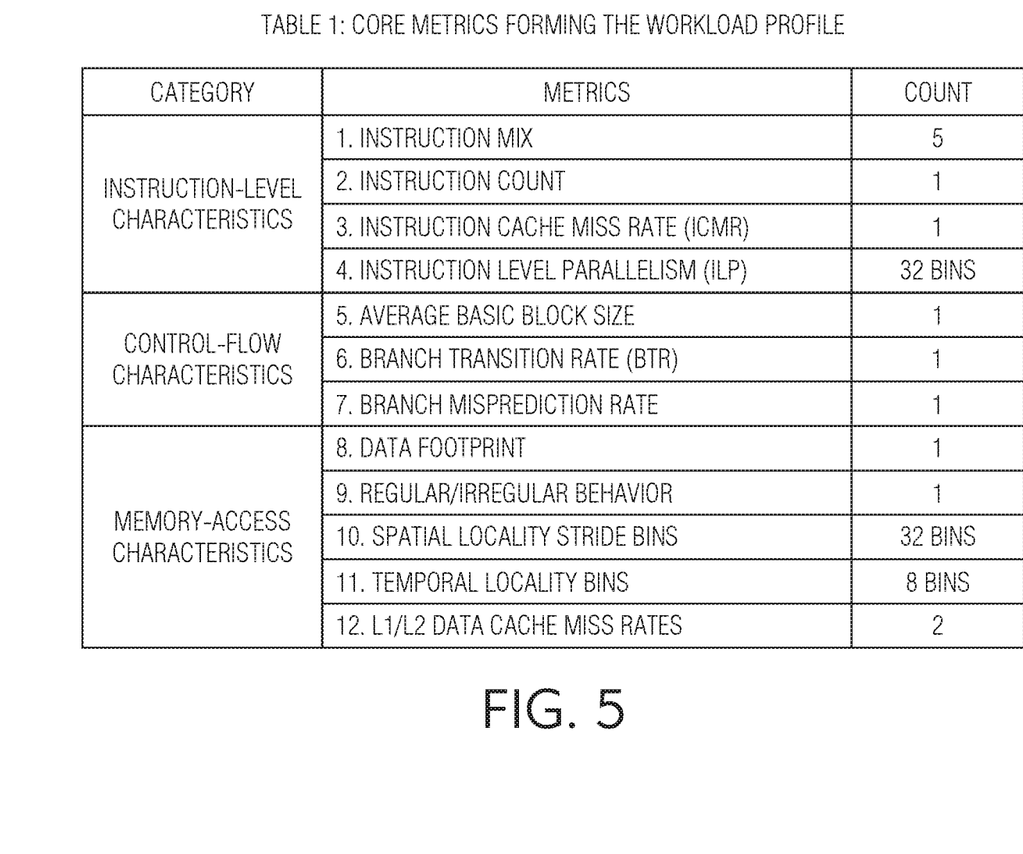
FIG. 5 is a table, Table 1, listing the core metrics forming the workload profile in accordance with an embodiment of the present invention.

Concerning the type of metrics ("core metrics"), the core feature set may be divided at a high-level into three categories (instruction-level characteristics, control-flow characteristics and memory-access characteristics), depending upon the aspects of program behavior that the individual metrics control. The three categories, together with their associated sub-categories and component metrics are shown in FIG. 5 and are described in detail below. FIG. 5 is a table, Table 1, listing the core metrics forming the workload profile in accordance with an embodiment of the present invention. It is noted that the core metrics discussed herein are not meant to be conclusive, but instead, form a set of key metrics that affect different aspects of program behavior. Nevertheless, the framework of the present invention is flexible enough to add new metrics, such as input/output characteristics, to control other aspects of program behavior. Furthermore, the principles of the present invention are not to be limited in scope to the metrics listed in Table 1, but may include other metrics than disclosed in Table 1, such as input/output characteristics.

As shown in FIG. 5, these metrics may correspond to instruction-level behavior of the applications, such as instruction mix, instruction count, instruction cache miss rate and instruction level parallelism.

As shown in FIG. 5, the first metric of instruction-level characteristics is the instruction mix (IMIX) of the application. In one embodiment, the present invention categorizes instructions into fractions of loads and stores (memory), control flow, integer and floating-point instructions. It should be noted that the framework is very flexible and can be easily extended to support specific instruction categories. The target IMIX can be provided as an input, in which case the present invention generates programs having the desired overall IMIX. Otherwise, IMIX values, randomized within bounded ranges, are used to generate the suite of training applications.

The second metric of instruction-level characteristics is the instruction count (IC) metric. IC controls the static instruction footprint of the application. The user can choose to either provide the IC metric directly or provide the target instruction cache miss rate (ICMR, third metric). In case the ICMR metric is provided, computing system 200 automatically determines the number of static instructions to instantiate in the synthetic benchmark to achieve the target ICMR. An initial estimate of the number of static instructions to be instantiated in the benchmark is made based on the assumption of a default instruction cache (ICache) size and configuration (e.g., 32 KB, 64 byte blocks, 2-way set-associative cache). It should be noted that this serves as an initial estimate only, the final static code size is further tuned to achieve the target instruction cache miss rate. In one embodiment, the ICache size can be provided and need not be assumed.

The fourth metric of instruction-level characteristics is instruction level parallelism (ILP), which is an important determinant of an application's performance. Tight producer-consumer chains in program sequences limit ILP and performance because of dependency-induced serialization effects. Computing system 200 models ILP by controlling the dependencies between instructions in the application sequence, which is modeled using the dependency distance metric. Dependency distance is defined as the total number of instructions in the dynamic instruction stream between the production (write) and consumption (read) of a register/memory location. In one embodiment, the dependency distance is classified into 32 bins, where each bin represents the fraction of instructions having that particular dependency distance. It varies from a value of 1, increasing up to 32 instructions and higher. The desired dependency distance could be provided as an input to computing system 200 or automatically randomized (within bounds) to generate training programs with varying degrees of ILP.

Concerning metrics in the category of control-flow characteristics, these metrics affect the program's control flow behavior.

The first metric of control-flow characteristics is the average basic block size. The average basic block size is an important metric because it determines the average number of instructions that can be executed in the program sequence without executing any control instructions. This can affect performance significantly depending on the branch predictor performance. Again, this metric could be provided directly as an input or inferred from the IC metric (previously described) and the percent of control instructions.

The second and third control flow metrics are the branch transition rate (BTR) and branch misprediction rate. Prior research studies have shown that an application's branch misprediction rate is highly correlated with the transition characteristics of the branch instructions. The idea behind this correlation is that the higher the transition probability of any branch instruction, the more difficult it is to predict its next direction and vice-versa. To model a certain BTR, one may choose a set of control instructions to be modeled with high transition probabilities and the remaining branch instructions to have very low transition probabilities. Computing system 200 may also model the transition probability of branch instructions in the synthetic in a directly correlated fashion to achieve a target branch misprediction rate.

Concerning metrics in the category of memory-access characteristics, these metrics affect the memory performance (data-side) of applications.

The first memory-access metric is the data footprint which determines the range of data addresses accessed by the synthetic application during its execution time. This is important because it can determine performance of different levels of caches and memory based on how large the footprint is with respect to the available cache size and memory structure.

The second memory-access metric is the memory access regularity/irregularity, which determines if the memory accesses made by load/store instructions of an application should have regular or irregular behavior. For irregular memory behavior, the present invention generates load/store instructions that access allocated and initialized memory regions (size is determined by the data footprint metric) based on a randomly generated sequence. Regular memory behavior is achieved using additional metrics (spatial and temporal locality metrics) as described below.

The third and fourth memory-access metrics are the spatial locality stride bins and the temporal locality bins. The fifth memory-access metric is the L1/L2 data cache miss rates. The principle of data locality and its impact on applications performance is widely recognized. The present invention models regular data memory accesses using simple strided stream classes over fixed-size data arrays, where strides are defined to be the difference between consecutive effective addresses. The present invention can also automatically estimate the strides based on the target data cache miss rate statistics. In one embodiment, the strides for a particular memory access are determined first by matching the L1 hit rate of a load/store, followed by the L2 hit rate. In one embodiment, a table is generated that holds the correlation between L1/L2 cache hit rates and the corresponding stride values to be used. The target L1/L2 hit rate information is used along with this table to generate stride values of load and store instructions. By treating all memory accesses as streams and working from a base cache configuration, the memory access model is kept simple. Strides can also be provided directly as an input to control spatial locality characteristics (bins represent strides from −1K to 1K as multiples of 64B). In one embodiment, the present invention also provides knobs to control the temporal locality (8 bins expressed as powers-of-two from 0 to 128) in the memory accesses. The temporal locality metric controls the number of unique memory accesses between access to the same memory location and affects the achieved cache miss rates as well. Together, the stride and temporal locality bin values are used to generate the sequence of memory addresses. While the foregoing discusses determining strides using the L1/L2 hit rate information, it is noted that strides may be determined using any data cache hierarchy, such as the L1/L2/L3 hit rate information.

Returning to FIG. 4, in conjunction with FIG. 3, in step 403, computing system 200 creates a profile 304 using fixed and/or random values of workload metrics.

In step 404, computing system 200 generates a suite of synthetic applications 306 using the created profile 304 to form a set of training programs which target particular aspects of program behavior. In one embodiment, workload profiles 304 are fed into code generator algorithm 305 that leverages these desired metrics to generate the suite of synthetic applications 306.

In step 405, computing system 200 trains the machine learning model using the set of training programs.

In one embodiment, the workload synthesis algorithm, based on the metrics discussed above, is as follows:

1) Generate a random number in the interval [0, 1] and select a basic block based on this number and the block's access frequency.

2) Basic block's size is determined to satisfy the mean and standard deviation of the target basic block size.

3) The basic block is populated with instructions based on the IMIX metrics, while ensuring that the last instruction of the basic block is a branch instruction.

4) Every instruction is assigned a dependency distance (i.e., a previous instruction that it is dependent upon) in order to satisfy the dependency distance criterion.

5) Load and store instructions are assigned a stride-offset based on the memory access model described above (regular or irregular).

6) An X86 test operation is used to set the condition codes that affect the outcome of the conditional branch instruction at the end of each basic block. The "test" operand is controlled to achieve the target BTR metric.

7) Increment the number of basic blocks generated.

8) If the target number of basic blocks have been generated, go to step 9, else go back to step 1.

9) Available architected registers are assigned to each instruction while satisfying the data dependencies established in step 4.

10) The above instruction sequence is generated as a part of two-level nested loops where the inner loop controls the data footprint of the synthetic application and the outer loop controls the number of dynamic instructions (overall runtime) in the program. Every static load or store instruction resets to the first element of strided memory streams and re-walks the entire stream in the outer loop iterations.

In one embodiment, code generator 305 generates the instruction sequence using C-language with embedded X86-based assembly instructions (using asm construct). An example code snippet is shown below.

```
{
    __asm___volatile__("BBL1INS0:add %%ebx,%%ebx")
    __asm___volatile__("BBL1INS1:mov 0(%%r8),%%ecx")
    __asm___volatile__("BBL1INS2:add %%ebx,%%ebx")
    __asm___volatile__("BBL1INS3:mov 0(%%r14),%%ecx")
    __asm___volatile__("BBL1INS4:add %%ebx,%%ebx")
    __asm___volatile__("BBL1INS5:test $0,%%eax")
    __asm___volatile__("BBL1INS6:jz BBL2INS0")
}
```

In one embodiment, code generator 305 can be modified to generate instructions for a different ISA. The code is encompassed inside a main header and malloc library calls are used to allocate memory for the data streams based on the target data footprint. Volatile directives are used for each asm statement and the program is compiled using the lowest compiler optimization level in order to prevent the compiler from optimizing out the program's machine instructions.

By using the present invention, the set of training applications are generated that provide a wider coverage of program behavior for more effectively training machine learning models. In one embodiment, the present invention allows a user to control a set of core workload characteristics using easily programmable knobs and thereby provides the ability to generate applications targeting specific program properties as well.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Many examples were illustrated using the x86 instruction set, however, the methodology is not limited to using the x86 instruction set. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating sets of training programs for machine learning models, the method comprising:

receiving fixed values of a first set of one or more workload metrics from a user and/or generating random values of a second set of one or more workload metrics within a bounded range, wherein said workload metrics correspond to program features which define particular application behavior, wherein characteristics of said workload metrics comprise the following: instruction-level characteristics, control-flow characteristics and memory-access characteristics;

creating, by a processor, a profile using said fixed values of said first set of one or more workload metrics and/or using said random values of said second set of one or more workload metrics; and generating, by said processor, a suite of synthetic applications using said created profile to form a set of training programs which target particular aspects of program behavior, wherein said suite of synthetic applications comprises a suite of software programs.

2. The method as recited in claim 1 further comprising:

training a machine learning model using said set of training programs.

3. The method as recited in claim 1, wherein said first set of one or more workload metrics contains different metrics than said second set of one or more workload metrics.

4. The method as recited in claim 1, wherein said fixed values of said first set of one or more workload metrics are received from said user via a user-controllable knob.

5. The method as recited in claim 1, wherein characteristics of said workload metrics further comprise input/output characteristics.

6. The method as recited in claim 1, wherein said instruction-level characteristics comprise the following: instruction mix, instruction count, instruction cache miss rate and instruction level parallelism.

7. The method as recited in claim 1, wherein said control-flow characteristics comprise the following: average basic block size, branch transition rate and branch misprediction rate.

8. The method as recited in claim 1, wherein said memory-access characteristics comprise the following: data footprint, memory access regularity/irregularity, spatial locality stride bins, temporal locality bins and L1/L2 data cache miss rates.

9. A computer program product for generating sets of training programs for machine learning models, the computer program product comprising a computer readable storage medium having program code embodied therewith, the program code comprising the programming instructions for:

receiving fixed values of a first set of one or more workload metrics from a user and/or generating random values of a second set of one or more workload metrics within a bounded range, wherein said workload metrics correspond to program features which define particular application behavior, wherein characteristics of said workload metrics comprise the following: instruction-level characteristics, control-flow characteristics and memory-access characteristics;

creating a profile using said fixed values of said first set of one or more workload metrics and/or using said random values of said second set of one or more workload metrics; and generating a suite of synthetic applications using said created profile to form a set of training programs which target particular aspects of program behavior, wherein said suite of synthetic applications comprises a suite of software programs.

10. The computer program product as recited in claim 9, wherein the program code further comprises the programming instructions for:

training a machine learning model using said set of training programs.

11. The computer program product as recited in claim 9, wherein said first set of one or more workload metrics contains different metrics than said second set of one or more workload metrics.

12. The computer program product as recited in claim 9, wherein said fixed values of said first set of one or more workload metrics are received from said user via a user-controllable knob.

13. The computer program product as recited in claim 9, wherein characteristics of said workload metrics further comprise input/output characteristics.

14. The computer program product as recited in claim 9, wherein said instruction-level characteristics comprise the following: instruction mix, instruction count, instruction cache miss rate and instruction level parallelism.

15. The computer program product as recited in claim 9, wherein said control-flow characteristics comprise the following: average basic block size, branch transition rate and branch misprediction rate.

16. The computer program product as recited in claim 9, wherein said memory-access characteristics comprise the following: data footprint, memory access regularity/irregularity, spatial locality stride bins, temporal locality bins and L1/L2 data cache miss rates.

17. A system, comprising:

a memory for storing a computer program for generating sets of training programs for machine learning models; and a processor coupled to the memory, wherein the processor is configured to execute the program instructions of the computer program comprising:

receiving fixed values of a first set of one or more workload metrics from a user and/or generating random values of a second set of one or more workload metrics within a bounded range, wherein said workload metrics correspond to program features which define particular application behavior, wherein characteristics of said workload metrics comprise the following: instruction-level characteristics, control-flow characteristics and memory-access characteristics;

creating a profile using said fixed values of said first set of one or more workload metrics and/or using said random values of said second set of one or more workload metrics; and generating a suite of synthetic applications using said created profile to form a set of training programs which target particular aspects of program behavior, wherein said suite of synthetic applications comprises a suite of software programs.

18. The system as recited in claim 17, wherein the program instructions of the computer program further comprise:

training a machine learning model using said set of training programs.

19. The system as recited in claim 17, wherein said first set of one or more workload metrics contains different metrics than said second set of one or more workload metrics.

20. The system as recited in claim 17, wherein said fixed values of said first set of one or more workload metrics are received from said user via a user-controllable knob.

* * * * *